Patented July 25, 1933

1,919,623

UNITED STATES PATENT OFFICE

HENRY DREYFUS, OF LONDON, ENGLAND

PRODUCTION OF USEFUL PRODUCTS FROM CELLULOSIC MATERIALS

No Drawing. Application filed February 18, 1932, Serial No. 593,857, and in Great Britain March 7, 1931.

This invention relates to the conversion of cellulose or cellulosic materials into dextrins, sugars and other conversion products.

It is well known that cellulosic materials can be transformed or converted into dextrins, sugars and other conversion products by treatment with aqueous solutions of acids, e. g. aqueous solutions of sulphuric acid. In such process the cellulose or cellulosic materials are usually either subjected to the action of hot or boiling dilute aqueous solutions of the acid (e. g. aqueous solutions of sulphuric acid of about 2 to 5% strength) under ordinary or raised pressure, or first dissolved in relatively strong aqueous solutions of the acid (e. g. sulphuric acid of about 60–80% strength) to form a primary conversion product which is then subjected to the action of hot or boiling dilute aqueous acid solutions (e. g. aqueous sulphuric acid of about 2 to 5% strength). In the latter method the product resulting from the action of the concentrated acid is usually diluted with sufficient water until the desired low acidity is attained and the diluted product subjected to the necessary heating or boiling. The method involving first treating the cellulose or cellulosic material with the concentrated acid is to be preferred in view of the higher yields of sugars, dextrins or other conversion products obtainable thereby. Both methods however suffer from the disadvantage that the acid is wastefully used. Thus in order to separate the dextrins, sugars or other conversion products from the dilute acid solutions, whether the cellulosic product is treated with a dilute acid solution or first with a concentrated acid and thereafter with a dilute acid solution, it is necessary to neutralize the acid, e. g. with chalk, lime or the like, before attempting to crystallize out or separate the conversion products. Further, when the cellulosic material is first dissolved in the concentrated acid solution a much larger proportion of acid is necessary for this step than is necessary for the subsequent treatment with the more dilute acid. A further disadvantage of such methods of treating cellulose or cellulosic materials is that uniform impregnation or admixture of the cellulosic materials with the aqueous acid (and hence uniform reaction) is a matter of difficulty when small or relatively small quantities of the acid solutions, particularly the concentrated acid solutions, are to be employed.

In accordance with the invention cellulose or other cellulosic material is transformed into conversion products by a process comprising treating the cellulose or cellulosic material with a solution of an acid in a volatile organic solvent. Acetone and ether are examples of solvents especially suitable for the purpose of the invention. By this means not only can the conversion products be produced in a very satisfactory manner, but the acids employed in the process can readily be recovered and used repeatedly for the process.

In performing the invention the cellulose or cellulosic material may be treated with a solution of an acid in a volatile solvent in any convenient manner. Preferably strong or relatively strong solutions of the acids, and particularly non-volatile acids, in the volatile solvents are employed. Thus, for instance, the materials may be treated with a solution of sulphuric acid in a volatile solvent containing about 30 to 80%, and particularly 60 to 80% of $H_2SO_4$. The treatment may be performed at low or ordinary temperatures, or at somewhat higher temperatures (e. g. between about 25 to 35° C.). Temperatures of between about 28 to 33° C. are found to be especially useful. I prefer to use more or less restricted quantities of the strong acid solution relatively to the cellulose or cellulosic materials, for example the solution may be employed in such quantity that the amount of acid present does not exceed twice the weight of the cellulose, and preferably is between about ¾ and 1¼ of the weight of the cellulose present.

The cellulose or cellulosic materials and the acid solutions can, of course, be mixed together in any convenient way. For instance the cellulose or cellulosic materials can be added in stages to the acid solution. In order to ensure thorough impregnation of the cellulosic materials with the acid solution the same may with advantage, especially when restricted quantities of the acid solution are to be employed, be soaked or steeped in a more dilute solution of the acid in the volatile solvent and after thorough impregnation or penetration be subjected to gentle heating and/or reduced pressure to evaporate off the excess volatile solvent and leave the desired amount of acid in the materials in the form of the solution of the desired concentration. Or for instance a thorough impregnation of the cellulose or cellulosic materials can be assured, especially when restricted quantities of acid are to be employed, by soaking or otherwise mixing the cellulose or cellulosic materials with relatively large quantities of acid solution, e. g. 10 to 20 or more times the weight of the cellulose or cellulosic materials, the materials being thereafter subjected to pressing or other convenient operation until the desired amount of acid solution is left impregnated in or mixed with the cellulose or cellulosic materials. In such a method of mixing or impregnating the cellulose or cellulosic materials they may, if desired, initially be soaked or impregnated with an acid solution of less concentration than it is desired to employ for the reaction on the cellulosic materials, in which case the cellulose or cellulosic materials may, after being subjected to pressing or other treatment to remove the excess acid, be subjected to treatment, for example to gentle heating and/or reduced pressure, to evaporate off the excess volatile solvent and leave the desired amount of acid in the materials in the form of the solution of the desired concentration. The mixture of acid solution and cellulosic materials, irrespective of the mode of addition of the materials together, is preferably subjected to kneading or stirring to ensure uniform action of the acid solution.

Preferably the acid solutions are caused or allowed to react upon the cellulose or cellulosic materials to such an extent that primary conversion products insoluble in acetone, ether or other volatile solvent are produced. The time necessary for the acid solution to effect such action upon the cellulosic materials may vary with the temperature and strength of the acid and the degree of division of the cellulose or cellulosic materials, the higher the temperature and concentration the less being the time necessary. Usually a time between about ½ hour and 24 hours is sufficient. With a sulphuric acid solution of about 60 to 80% strength and with a temperature of about 30° C. very useful results are obtained in between 4 and 12 hours.

The action of the acid solution upon the cellulose or cellulosic materials, particularly when strong or relatively strong solutions and/or higher temperatures are employed, should preferably be kept as short as possible in order to avoid any substantial conversion of the primary conversion products into products of further conversion such as dextrins or sugars which are soluble in the acetone or other volatile solvent employed.

The treatment of the materials is preferably performed in presence of small quantities of water, for instance in presence of not more than about 50% of water relative to the weight of the cellulose present in the materials. In cases where the treatment is to be performed in presence of quantities of water in excess of the normal humidity of the materials, the materials may, if desired, be impregnated in any convenient manner as uniformly as possible with some or all of the amount of water prior to impregnation with the acid solution. If desired, the acid solution may contain some or all of the water.

After treatment with the acid solution the acid solution can conveniently be extracted from or removed from the primary conversion product by extraction with a volatile solvent such as acetone or ether, the solvent employed for this purpose being preferably the same as that employed in the solution of the acid. Such extraction can be performed in any convenient way, as for instance by first treating the product with acetone to remove the bulk of the acid, and after separating the product washing with a further quantity of acetone to remove the acid as far as possible. The acid can be separated from the solution in the acetone or other volatile solvent for instance by heating to drive off the volatile solvent by which means the acid can be readily recovered in the concentration desired for its employment for treating further quantities of the cellulose or cellulosic materials. The volatile solvent can of course be recovered and employed for separating the acid from a further quantity of primary conversion products. Or, for instance, the dilute solution of acid formed in the extraction with the volatile solvent may be employed for impregnating further quantities of cellulosic materials and for the formation of the solution of acid of the desired concentration therein in the manner hereinbefore indicated.

The quantity of volatile solvent necessary to remove the acid from the primary conversion product will of course depend upon the degree to which it is desired to remove the acid and the conditions of operation. Generally a quantity in amount about 3 to 5 times that of the acid present is sufficient to remove substantially all acid present. Advantageously the separated primary conversion product can be washed with acetone or other volatile solvent, such treatment being especially advantageous when it is desired to obtain the primary conversion product substantially free from acid.

In cases where it is desired to transform the primary conversion product into products of further transformation, such as dextrins or sugars, the further conversion can be effected in any convenient way. For instance such further conversion can be effected by heating or boiling the separated primary conversion product under ordinary or raised pressure with a dilute aqueous acid (e. g. sulphuric acid of about ½ to 5% concentration). Such treatment can, if desired, be effected by subjecting to the action of hot or boiling dilute acid a primary conversion product from which substantially all acid has been removed by the volatile solvent. Preferably, however, a small amount of acid, e. g. about 5 to 20% of the acid originally employed for forming the primary conversion product is left in the primary conversion product, which product is then heated or boiled with water (under ordinary or raised pressure and preferably under reflux) until the desired stage of further conversion is attained.

The invention is not limited as to the solvents or to the cellulose or cellulosic materials to be employed. Instances of celluloses or cellulosic materials especially suitable for the purposes of the invention are wood, straw, grasses, cotton, wood pulps (e. g. sulphite, sulphate and soda pulps), reconstituted cellulose. Preferably the cellulose or cellulosic materials are employed in a fine form, e. g. cotton fibres, cotton linters, wood pulp in the form of fine chips, sawdust, ground mechanical wood pulp.

The following example serves to illustrate a convenient form of execution of the invention, it being understood that it is given solely by way of illustration.

*Example*

Cellulose containing about 20 to 25% humidity (natural or added) is thoroughly impregnated with about 10 times its weight of a solution of sulphuric acid in ether or acetone of about 30% strength and containing about 6% water (e. g. a 30% solution of 80% aqueous sulphuric acid in ether or acetone). The cellulose is then pressed until it retains about 4 times its weight of liquor. The acetone or ether is then evaporated off, preferably at low temperature and under reduced pressure, until the concentration of the sulphuric acid within the materials attains about 60 to 70% reckoned as a solution in the acetone or ether. The mass is then warmed to 30 to 35° C. for 6 to 8 hours. The primary conversion product so produced is extracted with acetone or ether (according to whether a solution of acid in acetone or ether is initially employed), in amount of about twice the weight of cellulose originally employed, to separate the bulk of the acid from the materials. The primary conversion product after separation from the extracting acetone (e. g. by filtration) is washed with a further quantity of acetone, e. g. about ⅓ to ½ of the weight of acetone employed for the first extraction, whereafter the primary conversion product may, if desired, be subjected to further hydrolysis.

The acetone extracts may be mixed together and made to serve for the treatment of further quantities of cellulose.

What I claim and desire to secure by Letters Patent is:—

1. Process for the production of cellulosic conversion products which comprises subjecting cellulosic materials to the action of solutions of acids in volatile organic solvents.

2. Process for the production of cellulosic conversion products which comprises subjecting cellulosic materials to the action of solutions of non-volatile acids in volatile organic solvents.

3. Process for the production of cellulosic conversion products which comprises subjecting cellulosic materials to the action of solutions of sulphuric acid in volatile organic solvents.

4. Process for the production of cellulosic conversion products which comprises subjecting cellulosic materials to the action of solutions of non-volatile acids in acetone.

5. Process for the production of cellulosic conversion products which comprises subjecting cellulosic materials to the action of solutions of sulphuric acid in acetone.

6. Process for the production of cellulosic conversion products which comprises subjecting cellulosic materials to the action of solutions of non-volatile acids in ether.

7. Process for the production of cellulosic conversion products which comprises subjecting cellulosic materials to the action of solutions of sulphuric acid in ether.

8. Process for the production of cellulosic conversion products which comprises subjecting cellulosic materials to the action of solutions of non-volatile acids in volatile organic solvents in the presence of water in amount up to about 50% of the weight of the cellulose present.

9. Process for the production of cellulosic conversion products which comprises subjecting cellulosic materials to the action of solutions of sulphuric acid in volatile organic solvents in the presence of water in amount up to about 50% of the weight of the cellulose present.

10. Process for the production of cellulosic conversion products which comprises subjecting cellulosic materials to the action of solutions of sulphuric acid in volatile organic solvents containing between about 30% and 80% of acid.

11. Process for the production of cellulosic conversion products which comprises subjecting cellulosic materials to the action of solutions of non-volatile acids in volatile organic solvents at a temperature of between about 25° and 30° C.

12. Process for the production of cellulosic conversion products which comprises subjecting cellulosic materials to the action of solutions of non-volatile acids in volatile organic solvents, the quantities of acid being less than twice the weight of the cellulose.

13. Process for the production of cellulosic conversion products which comprises impregnating cellulosic materials with a dilute solution of a non-volatile acid in a volatile organic solvent and evaporating the volatile solvent to concentrate the acid on the materials.

14. Process for the production of cellulosic conversion products which comprises subjecting cellulosic materials to the action of solutions of sulphuric acid in volatile organic solvents, the quantities of sulphuric acid being less than twice the weight of the cellulose.

15. Process for the production of cellulosic conversion products which comprises impregnating cellulosic materials with about 10 to 20 times their weight of a solution of sulphuric acid in a volatile organic solvent containing about 30% acid, pressing the materials until they contain the desired quantity of acid, and evaporating the volatile solvent to concentrate the acid on the materials.

16. Process for the production of cellulosic conversion products which comprises subjecting cellulosic materials to the action of solutions of non-volatile acids in volatile organic solvents, the reaction being terminated before any substantial proportion of water soluble conversion products has been formed.

17. Process for the transformation of cellulosic materials into conversion products by treatment with acids, wherein the said materials are treated with solutions of non-volatile acids in volatile organic solvents, and wherein the acids are removed from the reaction products by extraction with the said volatile organic solvents.

18. Process for the production of cellulosic conversion products which comprises subjecting cellulosic materials to the action of solutions of non-volatile acids in volatile organic solvents, the reaction being terminated before any substantial proportion of water soluble conversion products has been formed, and thereafter subjecting the products to further saccharification to produce water soluble substances.

HENRY DREYFUS.